June 6, 1972   J. M. KELLNER   3,667,817
DRILL PIPE WITH WEAR SLEEVE
Filed May 21, 1970   4 Sheets-Sheet 4

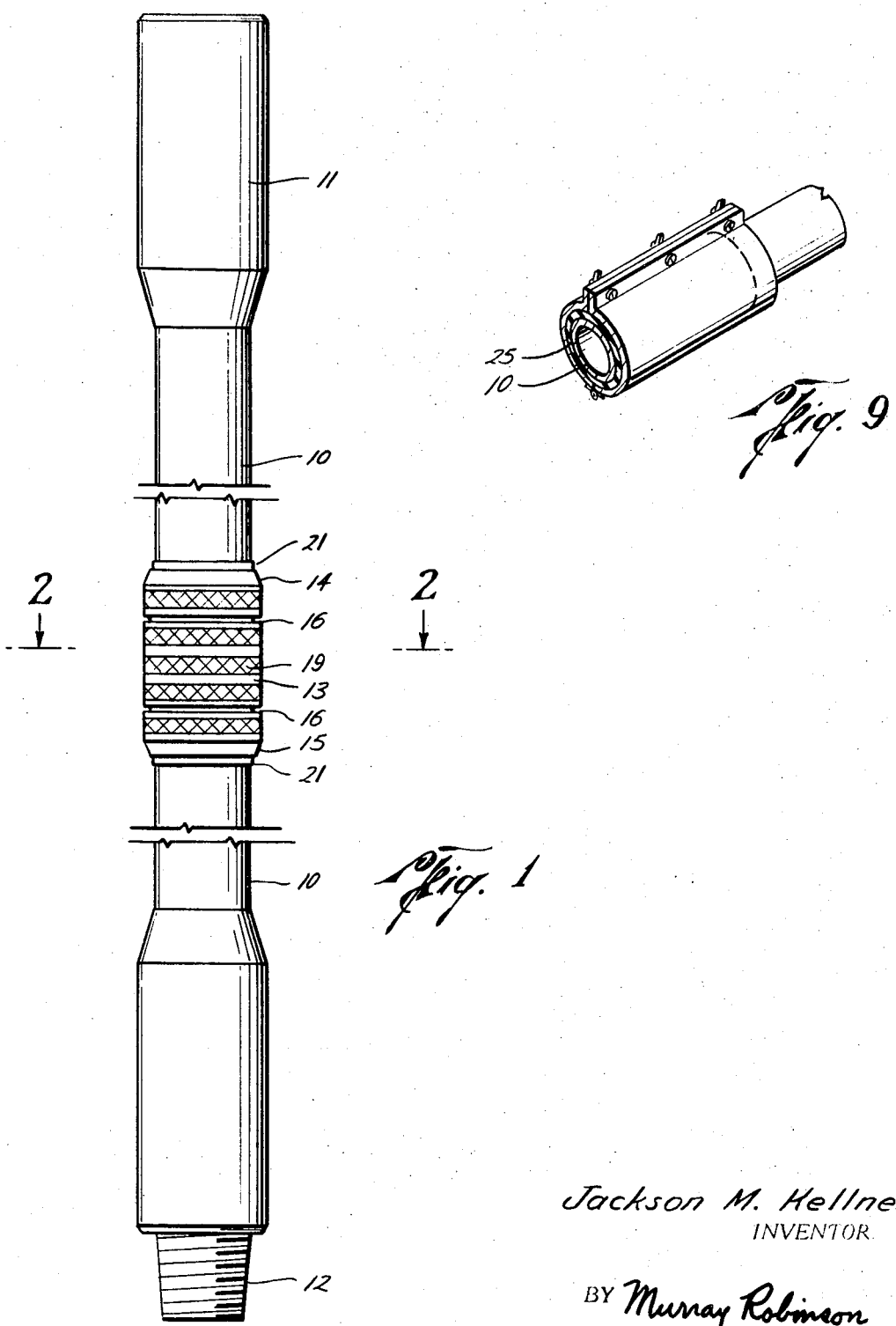

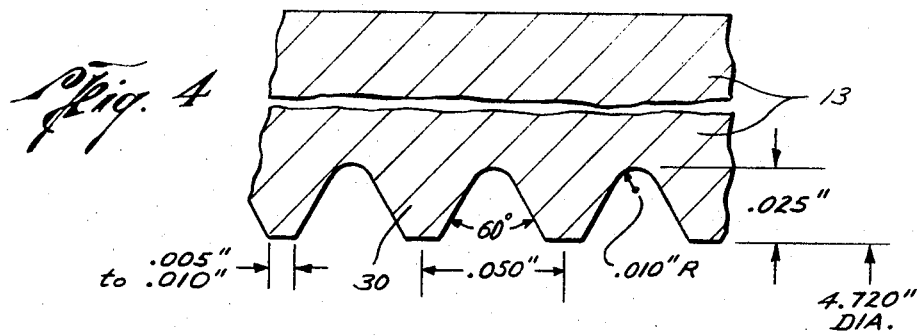
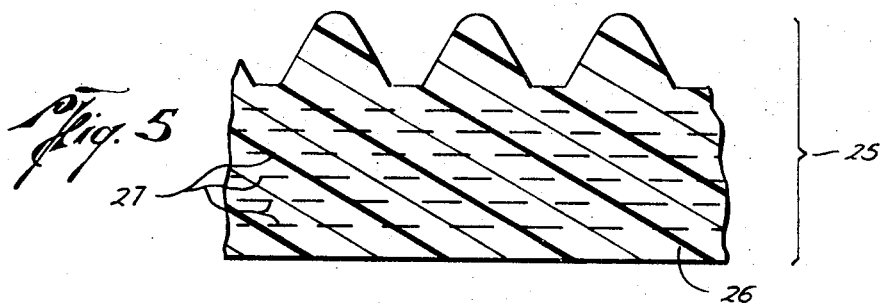
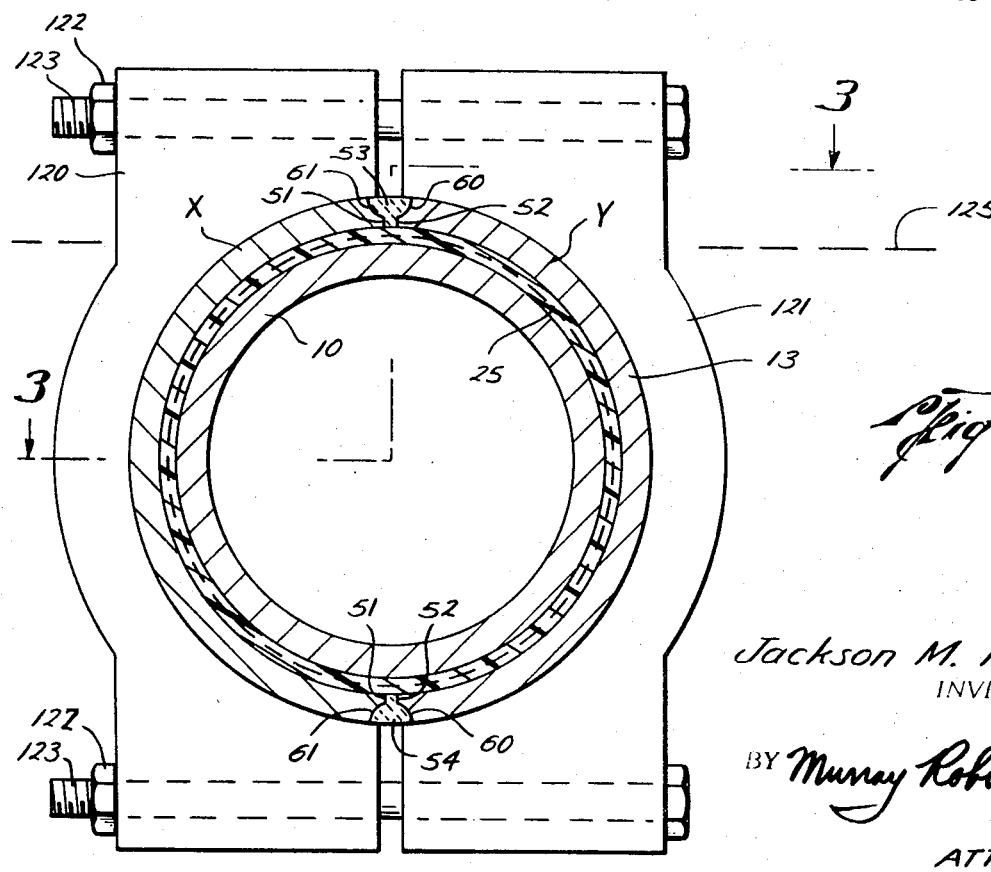
Jackson M. Kellner
INVENTOR
BY Murray Robinson
ATTORNEY

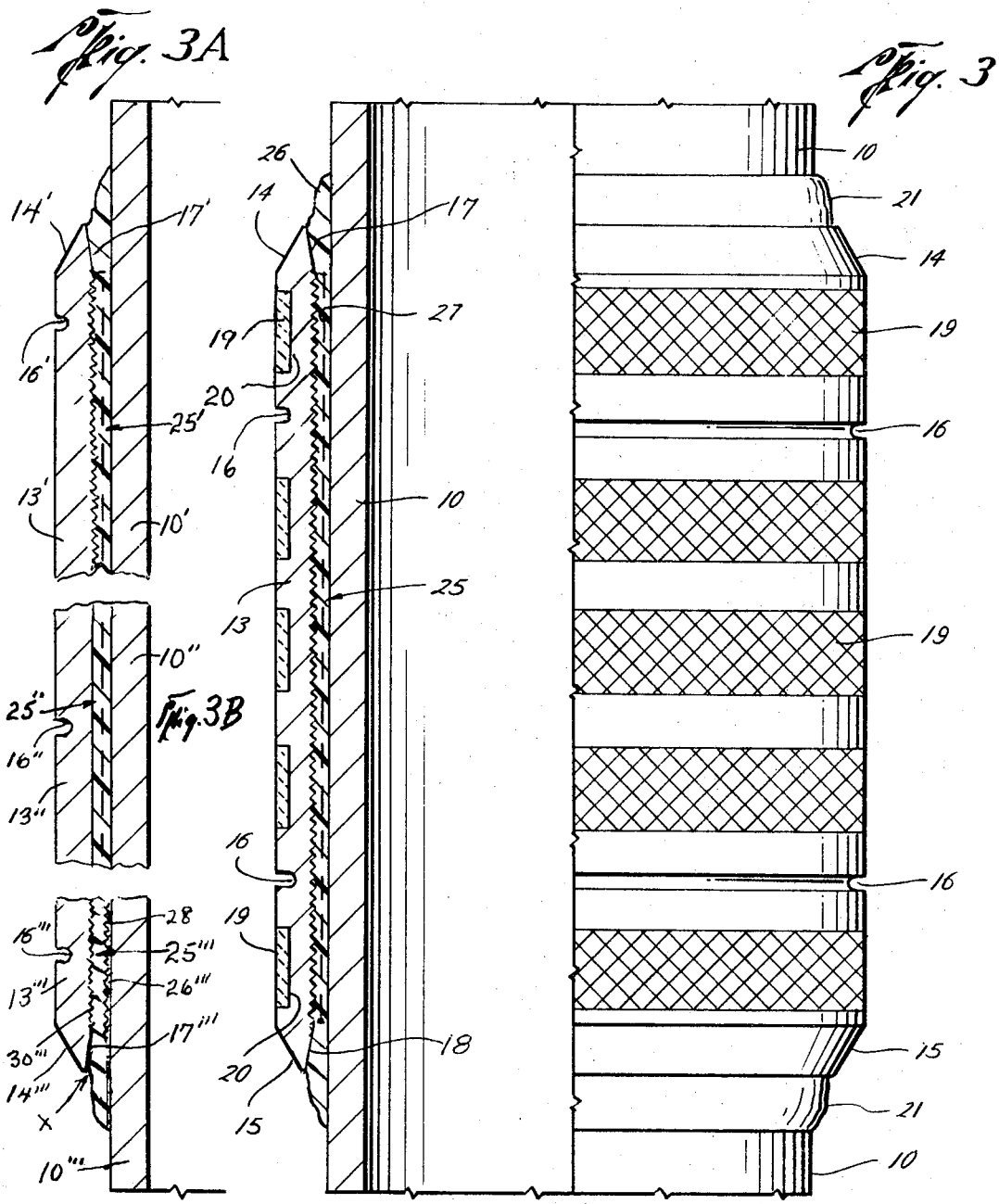

Jackson M. Kellner
INVENTOR.

BY Murray Robinson
ATTORNEY

United States Patent Office 3,667,817
Patented June 6, 1972

3,667,817
DRILL PIPE WITH WEAR SLEEVE
Jackson M. Kellner, Midland, Tex., assignor to Smith International, Inc., Midland, Tex.
Filed May 21, 1970, Ser. No. 39,430
Int. Cl. F16c 17/00
U.S. Cl. 308—4 A
4 Claims

ABSTRACT OF THE DISCLOSURE

A metal drill pipe is provided with a metal wear sleeve and a fabric reinforced flexible, adhesive, plastics material insert between the wear sleeve and the pipe. The insert is built up on the pipe by applying alternate layers of liquid, uncured plastics material and fabric. The sleeve is made in sections which are clamped around the insert. The insert is then cured and thereafter the sleeve sections are welded together. The sleeve is mechanically interlocked to the insert, e.g. by a thread on the inside of the sleeve. The ends of the sleeve are internally flared to increase their flexibility and further increase in flexibility is afforded by annular grooves in the outer periphery of the sleeve adjacent the internally flared end portions. The grooves also serve as wear indicators.

BACKGROUND OF THE INVENTION (a) Field of the invention

This invention relates to drill pipe used in the rotary system of drilling for petroleum, and to methods of making same, and more particularly to such drill pipe incorporating a plain or hard faced steel wear sleeve applied to the outer periphery of the drill pipe intermediate between the ends thereof to prevent wear on the drill pipe when used in open hole. In this regard a distinction should be made between such wear sleeves and so called "drill pipe protectors" used in cased hole which actually are primarily for the purpose of protecting the casing against wear due to the drill pipe rotating therein and which are usually made of soft material, e.g. rubber sleeves resiliently engaging the outer periphery of the drill pipe.

(b) Description of the prior art

The tool joints at the ends of a drill pipe are of larger diameter than the pipe and therefore largely prevent adjacent sections of the drill pipe from contacting the wall of a well bore. However drill pipe usually comes in twenty to forty, usually, thirty foot lengths which allows enough bend in the pipe or in the well bore between adjacent tool joints to let the pipe rub on the well wall. It is to protect the pipe against wear in the middle of the length of the pipe beween the tool joints that open hole wear sleeves are provided.

To protect the middle of the pipe, the wear sleeve must be at or adjacent the middle of the pipe. It is therefore necessary that a wear sleeve be secured to the pipe sufficiently to prevent its moving axially along the pipe. At the same time, the manner of securing the sleeve to the pipe must be such as not to weaken or unduly stress the pipe. The presence of tool joints at the ends of the pipe and the variations in outer diameter of the pipe as supplied by the pipe mill are factors which affect the choice of attachment means, dictating that the sleeve be split longitudinally to allow it to be placed around the pipe rather than the pipe threaded through the sleeve.

The application of plain and hard faced sleeves to pipes of various types for various purposes is exemplified by the following United States patents:

(a) Wear Sleeves For Drill Pipe: 2,259,023—Clark (Welded segments around stressed rubber); 2,295,873—Stone (welted segments around bonded rubber); 2,877,062—Hall et al. (welded cups around spring strips); 3,360,846—Schellstede et al. (shrink fitted segments); 3,499,210—Schellstede et al. (shrink fitted split sleeve).

(b) Tool Joint Wear Elements: 2,281,632—Steps (welded segments); 2,293,997—Neuhaus (welded strip); 2,334,350—Neuhaus (welded ring); 2,592,854—Boice (spring ring).

(c) Non-Rotating Sleeves: 2,318,878—Miller (drill pipe protector housing); 2,855,052—Wright (casing collar); 3,103,391—Leathers (stabilizer).

The prior art, as exemplified by the above listed patents, shows that it is known to apply hard facing to rings to be welded to tool joints, thereby to reduce wear of such joints. Due to the thickness of tool joints, welding a ring to the joint does not weaken the joint materially. In addition, it is recognized in the prior art that welding a wear sleeve directly to a drill pipe, which has a much thinner wall than a tool joint, would materially weaken the pipe.

The more recent Schellstede et al. patents represent an attempt to secure a metal wear collar directly to drill pipe, similar to the successful practice applied to tool joints, without damaging the pipe, as is the case with welding. The sleeve is attached by a shrink fit. However though there is no metal weakening due to welding directly to the drill pipe, if the shrink fit is not perfectly made, the sleeve can slide along the pipe. Also, the sudden change in stiffness of the drill pipe at the ends of the wear sleeve causes severe stress concentration in the pipe when the pipe flexes in use, thereby reducing the useful life of the pipe.

The prior art discloses that attempts have been made to apply wear sleeves to the middle of a drill pipe by means of what may be called the rubber sandwich technique. According to the latter construction, a metal sleeve of larger inner diameter than the outer diameter of the pipe is applied around the pipe with elastomer means interposed between the pipe and sleeve, thereby to prevent stress concentration in the pipe at the ends of the sleeve. As evidenced by lack of commercial acceptance, this technique has not generally been successful. This is believed to be due to insufficient attachment of the wear sleeve to the drill pipe to prevent axial movement of the sleeve on the pipe. The sleeve slips up to the nearest tool joint leaving the middle of the drill pipe unguarded.

In the application of W. R. Garrett, Ser. No. 39,255 filed concurrently herewith, entitled "Drill Pipe With Wear Sleeve," assigned to the same assignee as the present application, there is disclosed an invention prior to the present invention, said prior invention being an improvement upon the aforementioned rubber sandwich technique which results in a successful product. The present application discloses an alternate construction which is a departure from the rubber sandwich technique.

SUMMARY OF THE INVENTION

According to the invention, a metal wear sleeve is cemented directly to the drill pipe with a layer of resinous cement of sufficient thickness and physical properties to prevent stress concentration on the ends of the wear sleeve. Preferably the cement is reinforced with fabric. Alternately the insert may be considered to be a cement impregnated fabric insert.

Preferably an insert is provided having a higher elastic modulus than the usual elastomer whereby a greater prestress of the insert is obtained from shrinkage of the welds when the segments of the wear sleeve are welded together around the insert.

A further feature of the invention is the provision of a mechanical interlock between the inside of the metal wear sleeve and the outside of a resinous insert, the interlock including permeanently formed mechanical interlock means on both the sleeve and insert. This is achieved by threading or in other manner grooving the interior of the metal sleeve transverse to the pipe axis. When the sleeve is compressed against the uncured resinous cement insert, the cement flows into the grooves in the sleeve forming a mechanical interlock. The resultant grooving of the resinous insert becomes permanent when the cement is cured with the sleeve clamped in place.

The choice of insert materials is important. Preferably the material is a flexible adhesive plastic material such as an epoxy resin reinforced with glass cloth. This gives the necessary strength, shock and fatigue resistance, and temperature stability, together with resistance to deterioration in well fluids.

Other features of the invention, such as the thickness of the insert, the elastic modulus of the insert, and the materials used for the insert including both the fabric and the cement, and the shaped and construction of the sleeve segments and the manner of assembling, clamping and welding same, will become apparent from the following detailed description of the invention, reference being made to the accompanying drawings.

BRIEF DESCRIPTION OF THE DRAWINGS

FIG. 1 is an elevation of a length of drill pipe to which has been applied a wear sleeve in accordance with one preferred embodiment of the invention;

FIG. 2 is a fragmentary horizontal section taken at place 2—2 of FIG. 1 and showing also the clamp and water bath used in accordance with the method of the invention.

FIG. 3 is a vertical half section taken at plane 3—3 of FIG. 2;

FIGS. 3A, 3B, and 3C are fragmentary sections similar to FIG. 3, showing modifications.

FIG. 4 is an enlarged fragmentary vertical section through the wear sleeve showing the profile of the thread groove; and FIG. 5 is an enlarged fragmentary vertical section through the elastomer insert showing the profile of the grooves on the inner periphery thereof;

FIG. 9 is a pictorial view showing a step in the method of the invention.

DESCRIPTION OF PREFERRED EMBODIMENTS

Figure 6:
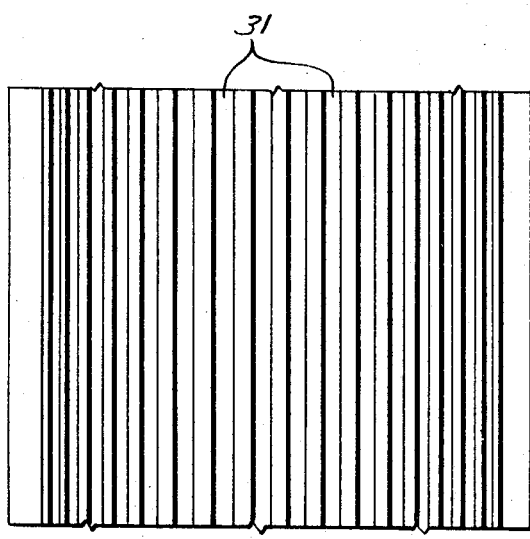
FIG. 6 is an elevation of a wear sleeve segment illustrating a modification.

Referring now to FIG. 1 there is shown a length of drill pipe 10 having a conventional tool joint box 11 at its upper end and a conventional tool joint pin 12 at its lower end, the box and pin being flash welded to the drill pipe to become unitized therewith. Intermediate between the ends of the drill pipe and spaced from the tool joints is attached a steel wear sleeve 13.

Although the invention is applicable to drill pipe made of light metal such as aluminum alloys, typically the drill pipe will be made of steel. In any event the drill pipe will be made of metal having a tensile and compressive strength of at least 20,000 lb./sq. in. and an elastic modulus of at least 10,000,000 lbs. per square. Such material may be termed strong metal, to distinguish it from such material as unalloyed lead and copper and nonmetallic materials such as plastics. Typically drill pipe has a wall thickness of between 1/8 and 1/2 inch, and thick walled drill pipe may be as thick as 3/4 inch or even up to a full inch.

The wear sleeve 13 is also made of strong metal. The sleeve may have a thickness of the order of 1/2 inch, e.g. 1/4 to 1 inch, the outer diameter preferably being of the order of tool joint diameter, e.g. one inch greater than that of a pipe of 4 1/2 inch outer diameter. The sleeve is preferably beveled at its ends 14, 15 to prevent hang up of the wear sleeve on projections from the wall of the wall bore. One or more annular grooves 16 are provided in the wear sleeve, said grooves providing increased flexibility to the sleeve. Preferably at least one such groove is provided near each end of the wear sleeve. Increased flexibility of the sleeve reduces stress concentration in the drill pipe when the latter bends inside the wear sleeve. In a wear sleeve of 1/2 inch thickness a suitable width for the flexure grooves is 1/8 inch with a depth of 3/16 inch. The flexure grooves also serve as wear indicators. Further increase in flexibility of the ends of the wear sleeve is achieved by internally flaring the ends of the wear sleeve at 17, 18. Together with the bevels 14, 15, there are thus formed flexible tips at the ends of the sleeve. In addition, the annular space between the sleeve and pipe is thereby increased at the ends of the sleeve.

The sleeve may be provided with a plurality of annular bands 19 of hard facing, such as sintered tungsten carbide, welded into annular grooves 20 (see FIG. 3). If desired, the hard facing can be omitted as shown in FIG. 3A, wherein like parts are numbered the same as in FIG. 3 except primed. As shown in FIG. 3A the outer periphery of the wear sleeve 13' is cylindrical and smooth except for the flexure grooves 16' at each end of the sleeve which have been moved closer to the flexure tips, e.g. as formed between bevel 14' and flare 17'. The grooves can also be omitted if it is desired to increase the amount of metal in the sleeve and if the construction of the sleeve and insert otherwise compensates for the increased rigidity of the sleeve. The choice of whether or not to use bands of hard facing on the wear sleeve is similar to the choice of whether or not hard facing is applied to the tool joints and depends upon whether the user is more concerned about wear on the drill pipe or wear on the casing in which the drill pipe rotates.

Referring now to FIGS. 2 and 3, it is seen that there is a tubular fabric reinforced resinous insert 25 interposed between the metal drill pipe 10 and the metal wear sleeve 13. The insert 25 is preferably an epoxy cement 26 reinforced with glass cloth 27, but other low elastic modulus flexible plastics materials can be used for the base material if they have sufficient strength, and other materials can be used for the reinforcement. A material can be considered flexible, as the term is here used with reference to suitable plastics materials, if a foot square sheet of 1/64 inch thickness can be manually bent double and undoubled and this flexure cycle repeated 100 times without failure of the material.

The insert as a whole should have a much lower elastic modulus than that of the drill pipe metal in order to prevent stress concentrations in the drill pipe at the ends of the wear sleeve as might otherwise occur. For steel pipe the insert modulus typically is in the range of 5 to 15% of that of the pipe, preferably about 10% or less. For aluminum pipe an insert modulus as high as 25% of that of the pipe would be representative, although a modulus not over about 10% of that of the pipe would still be desirable from this standpoint. The particular insert herein described has an elastic modulus of the order of 1 to 3 million lb./sq. in. as compared to an elastic modulus for steel of 30,000,000 lb. per square inch, and for alloy aluminum pipe of 12,000,000 lb./sq. inch. Preferably the elastic modulus is at least 100,000 lb./sq. in., as compared with a modulus of the order of 1000 lb./sq. in. for soft elastomers, so that by virtue of shrinkage of the welds used to unite the sleeve segments, there can be achieved a high initial compression of the insert which will insure a high resistance to slippage between the insert on the one hand and the wear sleeve and pipe respectively, on the other.

Other properties that the insert as a whole must have are strength, resistance to fatigue, elasticity, resistance to permanent set under sustained compressive loading, stability in well fluids, and retention of the foregoing desired properties at elevated temperatures encountered in earth bores. The base material of the insert should have good adhesiveness to the metals of the drill pipe and wear sleeve. The fabric reinforcement should have high tensile strength and flexibility to make up for any lack of these properties in the base material (cement).

The thickness of the insert is related to its elastic modulus. The insert should have enough thickness to prevent the wear sleeve from contacting the side of the drill pipe under expected load conditions. In this regard it is to be noted that the ends of the insert 25 preferably extend beyond the ends of the metal sleeve 13 to protect the drill pipe against corrosion by well fluids which may tend to accumulate adjacent the wear sleeve. The thickness of insert 25, exclusive of the mechanical interlock, is typically about ⅛ inch and preferably is between .05 and .25 inch, the lower end of the range being set in part by the thickness of the fabric reinforcement means embedded therein. The upper end of the range is determined in part by the availability of space, it being desired that most of the space be used up by the metal wear sleeve so as to lengthen the life of the sleeve and to provide sufficient thickness for welding together the sleeve, which is formed in segments as hereinafter described.

A suitable material for the base material of insert 25 is a synthetic resin or plastics material. A suitable material is an epoxy polymer made by the condensation of ethylene oxide and diphenol. A material that has been found especially suitable is an epoxy cement known as Devcon C, a trade name of Devcon Corporation, Danvers, Mass. Devcon C has an elastic modulus in tension of 1,200,000 lb./sq. in. and a hardness of 89 on the Shore D scale, as compared with a maximum of about 85 for the hard rubber, from which it is clear that Devcon C is beyond the hardness range of elastomers.

For the fabric reinforcement a suitable material is a square weave fabric coarsely woven from glass fibres, having a texture similar to burlap.

Referring now to FIGS. 4 and 5 as well as FIG. 3, mechanical interlock means is provided at the inner periphery of the metal sleeve 13 in the form of a screw thread 30. Suitable thread form and dimensions are indicated in FIG. 4. As the result of pressing sleeve 13 into the insert material prior to curing same, corresponding permament thread 40 is formed on the outer periphery of the insert as shown in FIG. 5.

Since the prior art sleeves and inserts have a certain amount of natural roughness but have been unsuccessful, it is necessary to draw a line of demarcation being such natural roughness and the mechanical interlock means of the invention. Since the prior art also shows that the wear sleeve inner periphery can depart from a smooth cylindrical shape by having shoulders at its ends, but such gross shaping also proved unsuccessful, it is also necessary to draw a line of demarcation between such gross shaping and the mechanical interlock means of the present invention. It is believed that the radial extent of the mechanical interlock means, be it a roughened surface, threaded surface, serrated surface, or shaped surface, preferably should lie in the range of .010 to .250 inch and the frequency of the surface interruptions forming the mechanical interlock means preferably should be between 4 and 100 per inch. The mechanical interlock means preferably should extend at least about 50 square inches, or about four inches axially and 360 degrees circumferentially for a 4½ inch outer diameter drill pipe.

Figure 7:
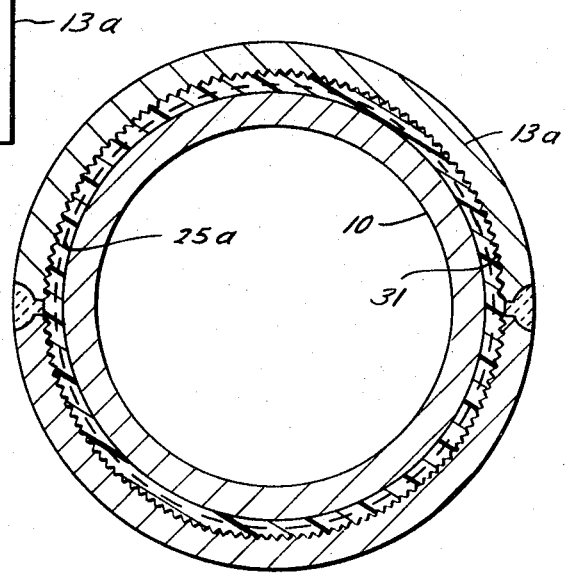
FIG. 7 is a horizontal section through a drill pipe incorporating the modification of FIG. 6.
Figure 8:
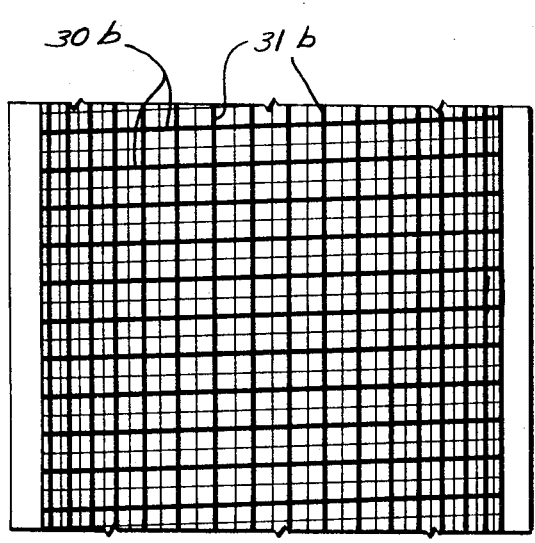
FIG. 8 is an elevation of a wear sleeve segment illustrating a further modification.

The lay of the mechanical interlock provided by threads 30 and 40 is primarily transverse to the axis of the drill pipe, so as to resist axial loading. By providing axial grooves 31 in the metal wear sleeve 13A, thereby forming correlative grooves 41 in the insert 25A when cured, as shown in FIGS. 6 and 7, the mechanical interlock will be parallel to the pipe axis, thereby resisting torsional loading. FIG. 8 illustrates combining longitudinal grooving 31A and a thread 30B, in the wear sleeve 13B (which forms correlative thread and axial grooves in the insert) providing resistance to both torsional and axial loading. On the other hand, if the anticipated loading does not exceed the adhesive strength of the epoxy, the mechanical interlock could be completely eliminated as shown in FIG. 3B wherein the parts are numbered the same as in FIG. 3 except double primed. FIG. 3B also illustrates that the flexure groove can be placed centrally between the ends of the wear sleeve. If desired, hard facing could be placed between the flexure groove 16' and the flexure tips, similar to the FIG. 3 instruction.

FIG. 3C shows that the flexure tip construction hereinbefore described can also be used in conjunction with an elastomer insert 25''' such as described in the aforementioned Garrett application filed concurrently herewith, such elastomer insert having a mechanical interlock thread 28 formed in its inner periphery engaging epoxy cement (Devcon C) 26''' previously applied to the pipe and not cured until after engagement with the thread 28. Mechanical interlock thread 30''' on the wear sleeve 13''' indents the elastomer when clamped therearound prior to heating the assembly to cure the cement. Due to the pressure of clamping the wear sleeve therearound, the ribbon insert bulges out at X to substantially fill the annulus between the flexure tip and pipe.

Referring once again to FIG. 2, the wear sleeve 13 is initially fabricated in two semi-cylindrical sections X and Y which are welded together at their longitudinal edges 51, 52, the weld beads being shown at 53, 54. The two sections X and Y may be made by sawing in half an initially integral (one-piece) cylindrical tube. Prior to sawing the tube in half it may be provided with longitudinal grooves at the areas of the saw cuts, thus leaving grooves 60, 61 in the longitudinal edges of the two sections at the outer peripheries thereof. When the two sleeve sections are assembled the two pairs of adjacent grooves 60–61 provide weld grooves adapted to receive the metal of the welds 53, 54 when the sections are assembled around the insert on the pipe.

Prior to assembling the sleeve sections around the pipe, it is necessary to build up the insert around the pipe by applying alternate layers of cement and fabric reinforcement, as will be detailed hereinafter.

It is important that a strongly adhesive cement be used for the base material of the insert and that the pipe surface be clean before the cement is contacted with the pipe. The pipe can be cleaned by sand blasting.

A preferred method for building up the insert and assembling and attaching the wear sleeve and insert to the drill pipe is as follows, assuming by way of example a 4½" outer diameter drill pipe with a steel cylinder wear sleeve 1" larger in diameter than the pipe and a ⅛" thick insert made of about 6 layers of coarsely woven, square weave, glass fibre cloth impregnated with Devcon C epoxy.

(1) Sand blast pipe over area of attachment.
(2) Heat Devcon C resin and pipe (over area of attachment) to about 200 deg. F.
(3) Mix hardener into resin.
(4) Apply thin coat of resin to pipe (about 10" long and fully around pipe).
(5) Begin wrapping glass fibre cloth onto pipe (cloth is 8 in. wide by 8 ft. long).
(6) After two layers of cloth are on pipe, apply thin layer of epoxy on cloth.
(7) Wrap two more layers of glass cloth and apply layer of epoxy.
(8) Wrap balance of cloth onto pipe and apply final layer of epoxy.
(9) Place steel wear pad sections around insert and clamp assembly together with two clamps, each clamp including two smi-cylindrical sections 120, 121, (FIG. 2) secured together by nuts 122 and bolts 123. The longitudinal edges 51, 52 of the wear sleeve are not in contact prior to tightening the clamps, but the clamps should be tightened until the slight clearance therebetween, e.g.

⅛ inch, is reduced to about 1/16". It is not necessary to close the gap fully prior to welding for the glass fibre insert reinforcement material can withstand considerable heat.

(10) Place assembly in oven and cure as follows:

250¼ F.—3 hours
350¼ F.—6 hours

(11) Place drill pipe portion carrying wear sleeve into water with pipe axis horizontal and upper-most weld groove just above water level (indicated at 125 in FIG. 2).

(12) Tack weld the upper-most (above water) weld groove, rotate pipe until other weld groove is similarly just above water, and tack weld the latter weld groove.

(13) Remove clamps.

(14) Alternately weld the grooves one pass at a time until grooves are filled and overflush.

(15) Grind welds flush.

The initial stress on the insert due to the clamping is preserved by the welds and is increased due to shrinkage of the welds on cooling, to the extent permitted by the initial gap between the longitudinal edges of the two sections of the wear sleeve. The drill pipe is then ready for use.

It may be added that the flexure grooves and the grooves that receive the hard facing may be formed in the wear sleeve either before it is cut in sections or after it is welded together in place around the pipe. If they are formed before the sleeve is cut in sections, there will be interruptions in the grooves due to the weld beads joining the sections, there being as many interruptions as sections, i.e. at least two or more if the sleeve is cut into more than two sections. These interruptions can be removed, if desired, e.g. by grinding or cutting. The hard facing can be applied to the grooves therefor at any time after the grooves are formed but preferably before the wear sleeve sections are cut apart.

As previously noted, the insert of the invention can be regarded as including a fabric insert cemented to the pipe and to the wear sleeve and itself impregnated with cement. The overall elastic modulus of the fabric is kept low due to its foraminous structure. As with a coil spring, considerable deformation of this fabric can occur before it goes solid. Although it would be difficult to illustrate in the drawing, the fabric may extend into the interlock thread formed when the wear sleeve is clamped around the insert and the cure cycle is performed.

If the fabric-resin composite insert were not fabricated in situ as hereinabove described, but were instead prefabricated in sections and then cured in situ, it might be desirable to use additional cement, perhaps different from the resin of the insert, for the purpose of aiding the bond between the insert and the pipe and sleeve, in which case the resin would not have to be a strong adhesive to metal and could be selected for other properties.

While a preferred embodiment of the invention and modifications thereof have been shown and described, further modifications thereof can be made by one skilled in the art without departing from the spirit of the invention.

What is claimed is:

1. Drill pipe made of strong metal and of elongated tubular configuration, said drill pipe having intermediate the ends of the pipe a wear sleeve made of strong metal and having an inner diameter larger than the outer diameter of the pipe whereby the sleeve is out of contact with the pipe, and a composite tubular insert composed of an elastic plastics material base with reinforcement means including a plurality of annular layers of foraminous material embedded in the plastics material base, the base material of said insert having an elastic modulus of at least 100,000 lb./sq. in. and said foraminous material having a greater strength and elastic modulus than said plastics material base, said insert having an overall elastic modulus less than twenty-five percent of that of the metal of the pipe and being disposed between said metal pipe and metal wear sleeve and under compression between the metal pipe and metal wear sleeve, said metal wear sleeve having indenting means distributed over an area of the inner periphery thereof impressed into the outer periphery of the composite insert forming a mechanical interlock between the metal sleeve and the composite insert, said composite insert being secured to said metal pipe by adhesive plastics material at the interface of said insert and pipe, said sleeve including at least one section of weld metal extending from one end of the sleeve to the other end of the sleeve, said metal sleeve being in hoop tension around said composite insert.

2. Drill pipe according to claim 1 wherein said foraminous material comprises a plurality of layers of glass fibre cloth wrapped around the pipe, said indenting means on the inner periphery of said sleeve having a radial extent of .05 to .25 inch and a frequency in at least one direction of between 4 and 100 interruptions per inch and extending over at least 50 square inches, the surface of said pipe between said insert and pipe being relatively smooth compared to the surface of said insert whereat is located said indenting means, the base material of said insert being an epoxy cement by which said composite insert is adhered to said smooth surface of the metal pipe.

3. Drill pipe according to claim 2, wherein the outer surface of the sleeve and the outer surface of the pipe facing the insert are cylindrical, the ends of said sleeve flaring away from the pipe forming thin walls at the ends of the sleeve providing increased flexible and increasing the spacing between the ends of the sleeve and the pipe, said insert filling the space between said flared ends and the pipe.

4. Drill pipe according to claim 3, said ends of the sleeve being externally bevelled forming flexible tips on the sleeve between the bevelled and flaring surfaces thereof, said sleeve having a flexure groove on the outer periphery thereof at each end thereof adjacent the base of the flexible tip forming the end of the sleeve.

References Cited

UNITED STATES PATENTS

| 2,663,599 | 12/1953 | Mackay | 308—4 A |
| 2,281,632 | 5/1942 | Steps | 308—4 A |
| 1,863,823 | 6/1932 | Barclay | 308—4 A |
| 166,735 | 8/1865 | Walworth | 285— DIG 16 |
| 2,259,023 | 10/1941 | Clark | 285—286 |
| 2,943,009 | 6/1960 | Mirsky et al. | 308—4 A |
| 2,212,153 | 8/1940 | Eaton et al. | 287—85 |
| 1,938,822 | 12/1933 | Fellin | 308—4 A |

MARTIN P. SCHWADRON, Primary Examiner
R. H. LAZARUS, Assistant Examiner